United States Patent [19]

Toth et al.

[11] 4,152,581
[45] May 1, 1979

[54] SYSTEM FOR OPERATING A POSTAGE METERING MACHINE KEYBOARD

[75] Inventors: John E. Toth; Thomas E. Toth; Lawrence J. Kamm, all of San Diego, Calif.

[73] Assignee: Orbitran Company, Inc., Lakeside, Calif.

[21] Appl. No.: 884,136

[22] Filed: Mar. 7, 1978

Related U.S. Application Data

[63] Continuation of Ser. No. 682,110, Apr. 30, 1976, abandoned.

[51] Int. Cl.² ........................... G06C 7/02; H01F 7/14
[52] U.S. Cl. .................................... 235/146; 235/101; 335/253
[58] Field of Search .................... 235/146, 145 R, 101; 335/253, 220; 197/13, 14, 98; 340/365 L

[56] References Cited

U.S. PATENT DOCUMENTS

| | | | |
|---|---|---|---|
| 2,014,432 | 9/1935 | Gerhold | 235/146 |
| 2,448,959 | 9/1948 | Conlan | 335/253 |
| 2,970,756 | 2/1961 | Spesock et al. | 235/146 |
| 3,072,331 | 1/1963 | Kennis | 235/146 |
| 3,091,725 | 5/1963 | Huston | 335/253 |

FOREIGN PATENT DOCUMENTS 583601 9/1933 Fed. Rep. of Germany ........... 235/146

Primary Examiner—Stephen J. Tomsky
Attorney, Agent, or Firm—Brown & Martin

[57] ABSTRACT

The system responds to signals from a weight computer to depress selected keys on the postage metering machine keyboard. A solenoid is associated with each key. The solenoids are mounted on a carriage for movement toward and away from the keyboard. Spring bias and weight forces the carriage toward the keyboard. Energized solenoids hold an engagement tip extended so that when the carriage is released toward the keyboard, the carriage force will depress the selected key. The engagement tip on unenergized solenoids contact the key but the solenoid shaft moves upward into the solenoid without depressing the key.

8 Claims, 12 Drawing Figures

SYSTEM FOR OPERATING A POSTAGE METERING MACHINE KEYBOARD

This is a continuation of application Ser. No. 682,110, filed Apr. 30, 1976 now abandoned.

BACKGROUND OF THE INVENTION

Large numbers of semi-automatic postage metering machines are in use. With such a machine, when used for posting packages, the package weight is first determined by independent means, and the appropriate postage calculated. The operator then manually enters the correct postage into the machine by depressing keys in columns of keys corresonding to the postage amount. After the correct postage is entered, the switch is pressed to cycle the machine and cause a tape with the appropriate postage printed upon it to be dispensed from the machine. Scales have been provided which automatically compute the applicable price associated with a given weight. For example, such scales may be adjusted to provide an output to a display and to associated equipment corresponding to the price associated with the particular weight. Such a scale can be utilized to determine the postage required for a parcel of given weight. However, when used in association with a conventional postage machine, the postage must still be manually entered into the keyboard of the machine to obtain a tape for the package having the appropriate postage.

The deficiencies of present day semi-automatic systems are particularly apparent when they are utilized to post a large number of packages, each having a different weight, or being sent to a different postal zone, and therefore requiring a different postage amount. Not only are existing systems time consuming, but they frequently result in errors. The large number of parcels causes the operator to lose a sense of the relationship between the weight of a particular parcel and the postage being applied, and therefore, it is not uncommon for a package requiring a postage of, for example $.77, to have $7.07 of postage applied.

The manufacture and use of postage machines is carefully regulated by the United States Postage Service in part to avoid tampering with the postage meter mechanism. Therefore, it is not permissible to modify such machines to fully automate their operation.

Therefore, it is desirable to have a system for interfacing between an automatic weighing-read-out device and conventional postage metering machines so that the output of the weighing device controls the automatic entry of the proper postage amount into the keyboard of the postage metering machine. Such a device is particularly desirable where no modifications to, or permanent attachments to, the postage metering machine are required.

SUMMARY OF THE INVENTION

An exemplary embodiment of the invention has particular application to postage metering machines incorporating a keyboard postage amount entry mechanism. Operating components of the system are fitted over the keyboard and latched into relationship with the keyboard so that a solenoid is positioned directly over each key in each of the postage amount columns. The solenoid plungers have an engagement tip for contacting the surfaces of the key and pressing the key without damaging the key surface. A similar engagement tip is positioned over enable and clear keys. As will appear more fully hereinafter, the enable key is automatically pressed during each cycle of the machine and the clear key is manually depressed at the operator's option. Electrically powered solenoids from the state of the art are capable of directly operating a key. However, the force required to operate the keys is approximately two pounds and a conventional solenoid sufficient to that purpose exceeds the cross-sectional area available above the individual keys. Also, if jamming of the key were to take place, such a solenoid might apply excessive force thereby damaging the key and associated mechanism.

The unique solenoids of the instant invention are arranged so that the armature and associated plunger are fully extended by gravity, or the alternative, by the pressure of a light spring. Accordingly, upon energization of the solenoid the armature is already in contact with the coil-pole piece. A large holding force is thereby obtained with a relatively small current so that pressure against the plunger will not break the magnetic circuit between the armature and coil.

In an alternative embodiment of the invention, upon energization the armature is drawn transversely of the armature axis. A lock flange cooperates with a corresponding lock recess to cause a locking engagement that prevents the armature from moving axially. In unenergized solenoids, the light spring pressure holds the lock flange out of engagement with the lock recess so that the armature may be pressed axially within the solenoid by contact with the key surface.

In either embodiment, the solenoids are mounted on a carriage for vertical movement toward and away from the key surfaces. The carriage is normally biased toward the key surface by spring pressure. Flexure springs have particular advantages for this purpose, as they can serve both as the biasing mechanism and as the suspension for the translational movement of the carriage. Such flexures have a low friction and therefore, can produce a predictable spring bias. The carriage is normally supported against the spring bias by a follower and eccentric. The follower is secured to the carriage and engages an eccentric mounted for rotation on supporting structure. As the eccentric is driven through one complete revolution, the carriage, under the influence of the spring bias, is alternated, released and lifted for movement in a reciprocating cycle.

The eccentric is driven by a one-revolution motor that operates in response to a mementary start signal to complete a complete revolution and automatically shuts itself off. A micro switch is engaged by the carriage structure so that when the carriage reaches its lowest point of travel, the micro switch contacts are closed providing power to a cycle solenoid. Thus when the carriage is at its lowest point of travel and the selected keys are depressed, the system automatically causes the cycle switch of the postage metering machine to be depressed causing tape printing and tape ejection to take place.

During each cycle of the carriage, the fixed enable plunger and engagement tip depresses the enable key so that the dollars and tens of dollars columns may be operated if a postage in that amount is computed.

It is therefore an object of the invention to provide a new and improved system for operating a postage metering machine.

It is another object of the invention to provide a new and improved system for operating a postage metering machine that may be applied to a conventional keyboard-type postage metering machine.

It is another object of the invention to provide a new and improved system for operating a postage metering machine that may be applied to the postage metering machine without permanent attachments.

It is another object of the invention to provide a new and improved system for operating a postage metering machine that does not interfere with normal machine functions.

It is another object of the invention to provide a new and improved system for operating a postage metering machine that depresses the keys of a keyboard-type postage metering machine with a controlled and limited force.

It is another object of the invention to provide a new and improved system for operating a postage metering machine that completes the steps of operating selected keys and obtaining an imprinted postage tape without human intervention.

It is another object of the invention to provide a new and improved system for operating a postage metering machine that has a low maintenance requirement.

It is another object of the invention to provide a new and improved system for operating a postage metering machine with low failure-rate solenoids.

It is another object of the invention to provide a new and improved system for operating a postage metering machine that may be easily removed for conventional operation of the machine.

Other objects and many attendant advantages of the invention will become more apparent upon a reading of the following detailed description together with the drawings in which like reference numerals refer to like parts throughout and in which.

DETAILED DESCRIPTION OF THE DRAWINGS

Figure 1:
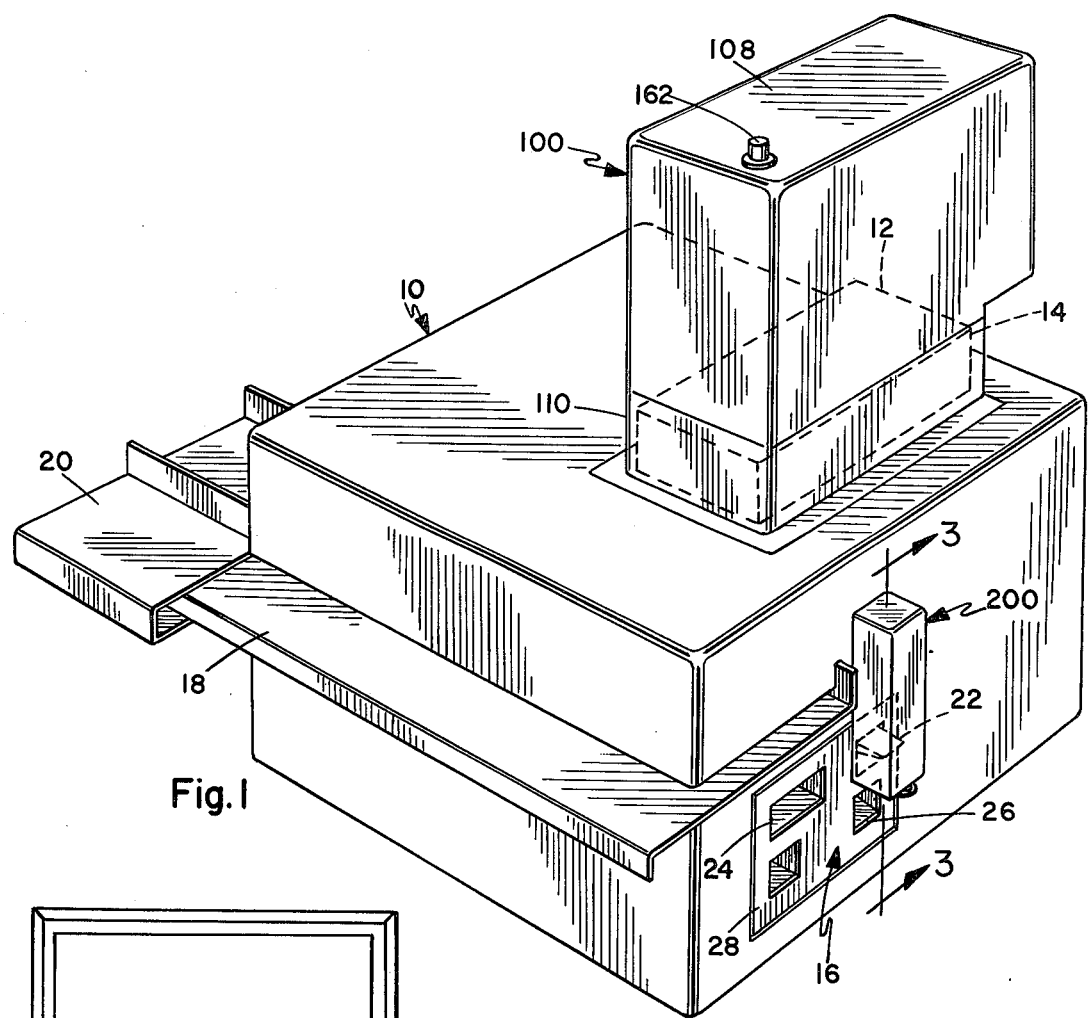
FIG. 1 is a perspective view of the postage metering machine with the operating system attached.

Referring now to the drawings, there is illustrated in FIG. 1 a conventional postage metering machine 10 incorporating a keyboard 12 for entry of selected postage amounts. The keyboard is supported in an upright keyboard housing 14. The keyboard operating mechanism 100 according to the invention is received over the keyboard housing 14.

The machine 10 incorporates a print support plate 18 and an envelope guide 20 utilized for the imprinting of envelopes according to a conventional mode of operation. The postage tape imprinting mode of the machine is selected from the control panel 16. A cycle switch 22 selects the postage tape print and eject mode of operation. The imprinted tape is delivered from slot 24. A switch located in recess 26 selects between recycle and automatic clear modes for the tape imprinting operation. The several controls are operated through the panel door 28. A cycle solenoid 200 according to the invention is positioned over the cycle switch 22 and releaseably attached to the door 28.

Figure 2:
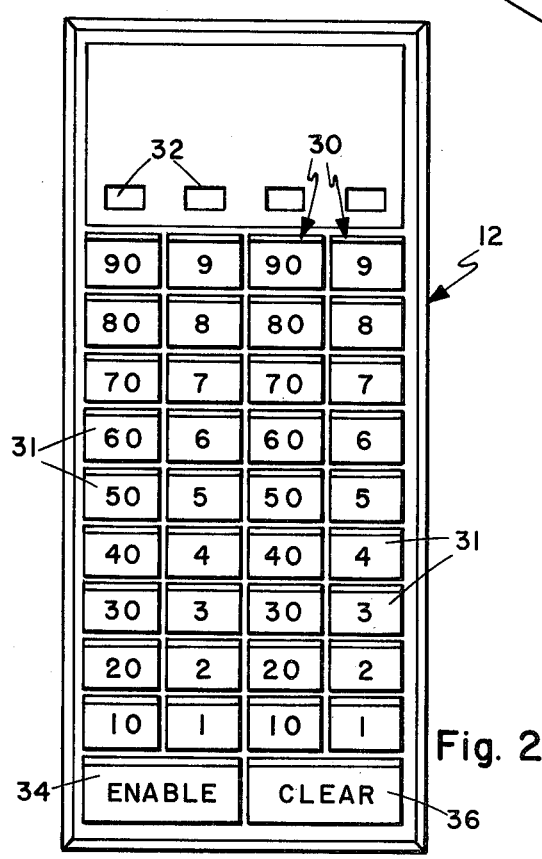
FIG. 2 illustrates a typical keyboard which is operated by the system.

Referring particularly to FIG. 2, the configuration of the keyboard 12 is illustrated. A plurality of number keys 31 are formed in columns 30 in tens of dollars, dollars, tens of cents and cents columns. The key depressed in a column is displayed in display windows 32. Enable key 34 must be pressed prior to entering an amount in the tens of dollars or dollars columns. Incorrect entries or entries for which the operator elects to discontinue repetition are cleared by the operation of the key clear 36.

Figure 4:
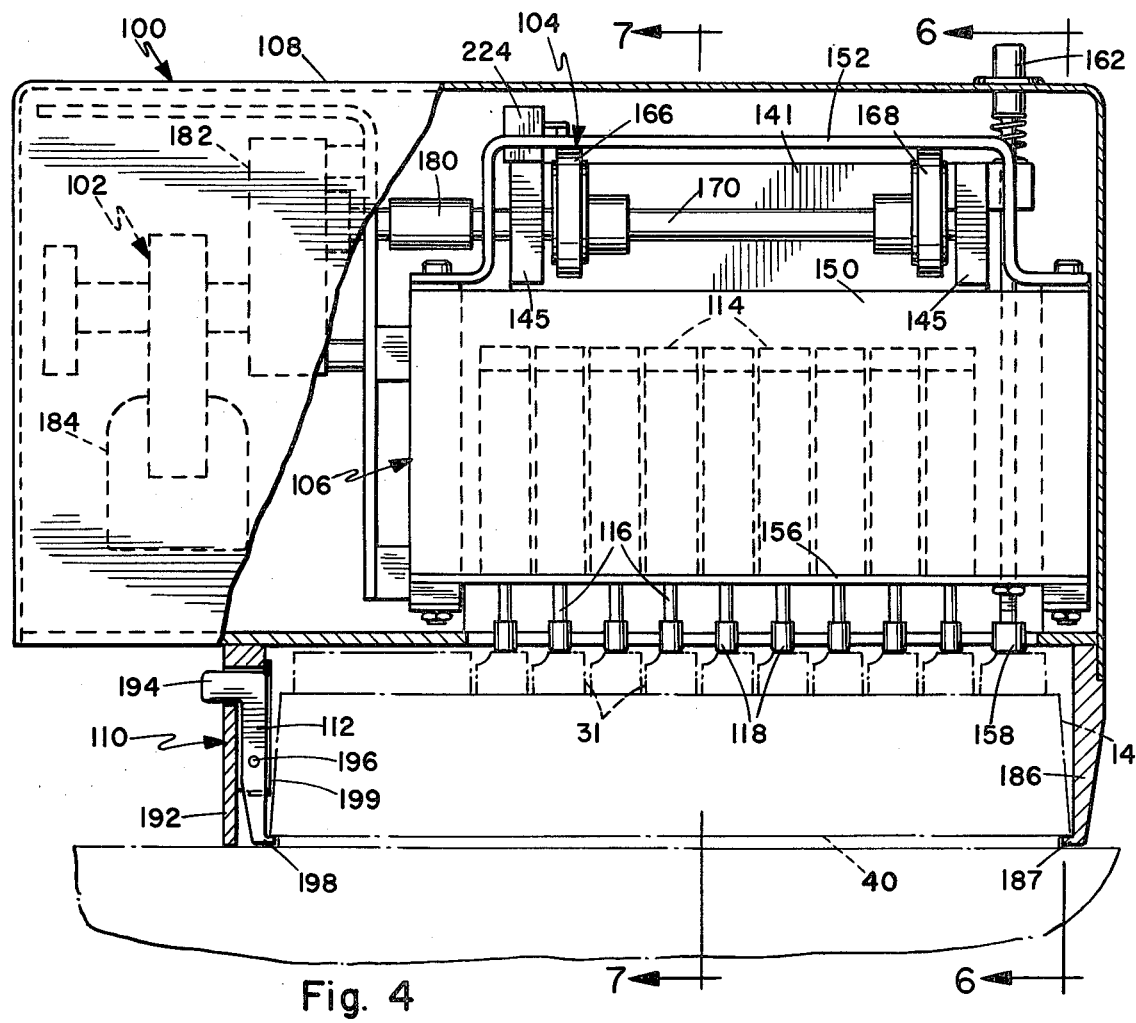
FIG. 4 is a side elevation view of the keyboard operating mechanism with portions cut away.

Referring particularly to FIG. 4, the principal operating components of the keyboard operating mechanism 100 are illustrated. A drive mechanism 102 rotates an eccentric assembly 104 to reciprocally lift and release a carriage assembly 106. The drive mechanism, eccentric assembly and carriage assembly are all housed within a main housing 108. The main housing 108 is carried on an engagement housing 110, which fits around the keyboard housing 14. Latch 112 is operated for a releaseable engagement between the engagement housing 110 and keyboard housing 14.

Figure 6:
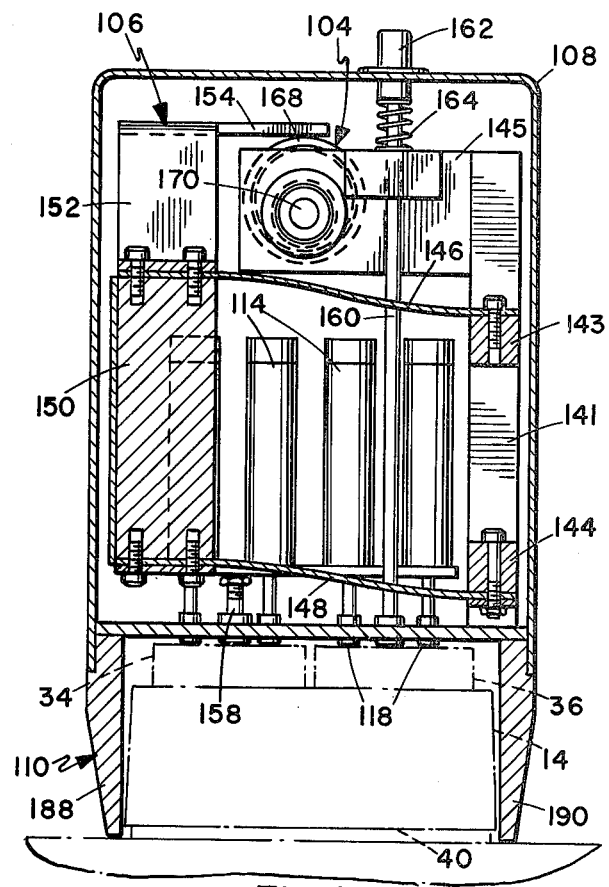
FIG. 6 is a sectional view taken on line 6—6 of FIG. 4.
Figure 7:
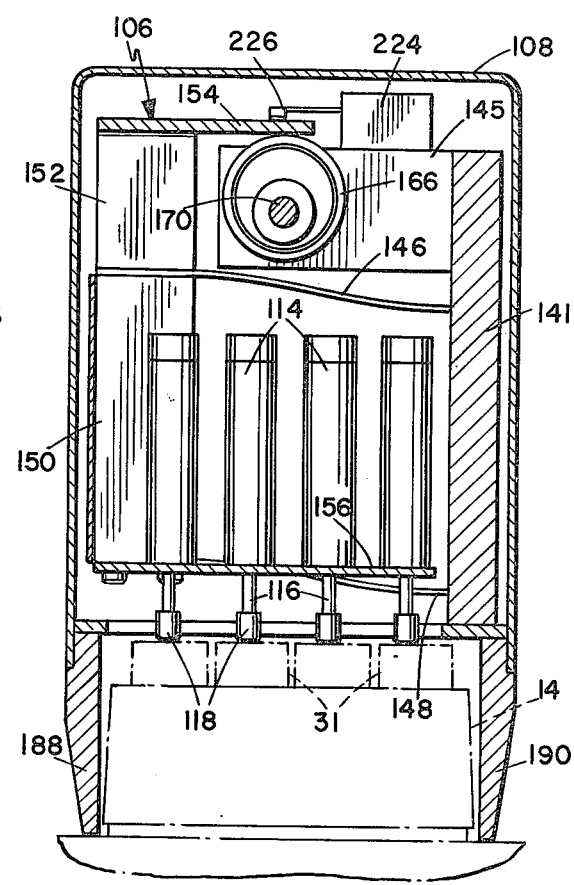
FIG. 7 is a sectional view taken on line 7—7 of FIG. 4.
Figure 8:
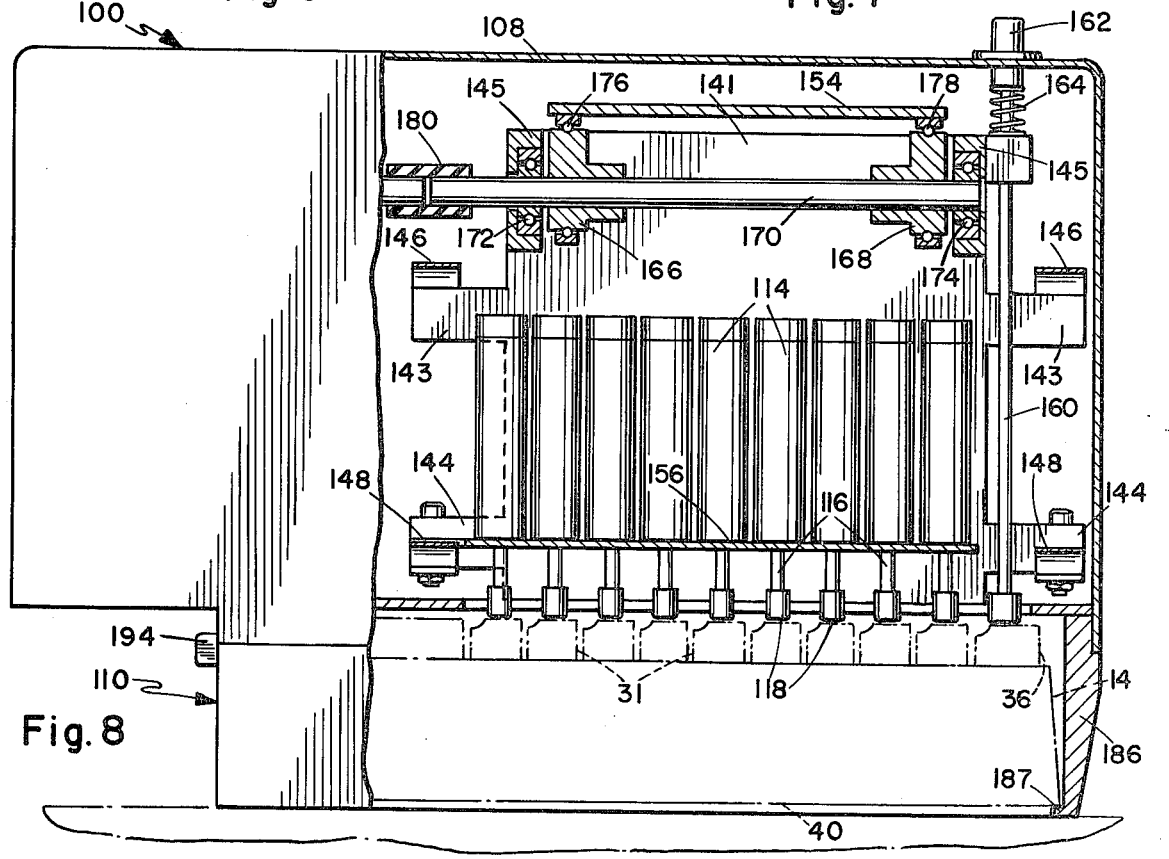
FIG. 8 is a sectional view taken on line 8—8 of FIG. 5.

Referring particularly to FIGS. 6 through 8, a plurality of solenoid assemblies 114 are illustrated carried on plate 156 within the carriage assembly 106. Each of the solenoid assemblies 114 are identical and a typical solenoid assembly 114 is illustrated in detail in FIG. 10.

The solenoid assembly 114 incorporates a central shaft 116 which is free to move in reciprocating movement in and out of the coil 122. The shaft terminates at its lower end in an engagement tip 118 and at its upper end in an armature 120. For clarity, the solenoid is illustrated in its withdrawn or deactivated state. The dotted line position of the armature 120 corresponds to the resting and energized state. During normal operation, the solenoid is energized when the armature 120 is in mangnetic flux path relationship with the coil 122. The armature 120 is of magnetically permeable material so that the magnetic flux field generated by the coil 122 passes through the amrature 120 and forms a strong magnetic bond holding the armature 120 in position. The magnetic bond is considerably greater than the drawing force that would be created by an equivalent current in an equivalent coil with an armature out of contact with the associated coil. Logic level currents on the order of 60 ma are sufficient to produce a holding power in excess of two pounds. Since the solenoid does not operate in an extension and retraction mode, as with conventional solenoids, a unique operating mechanism is required as will be set forth more fully hereinafter.

Figures 9, 10, 11:
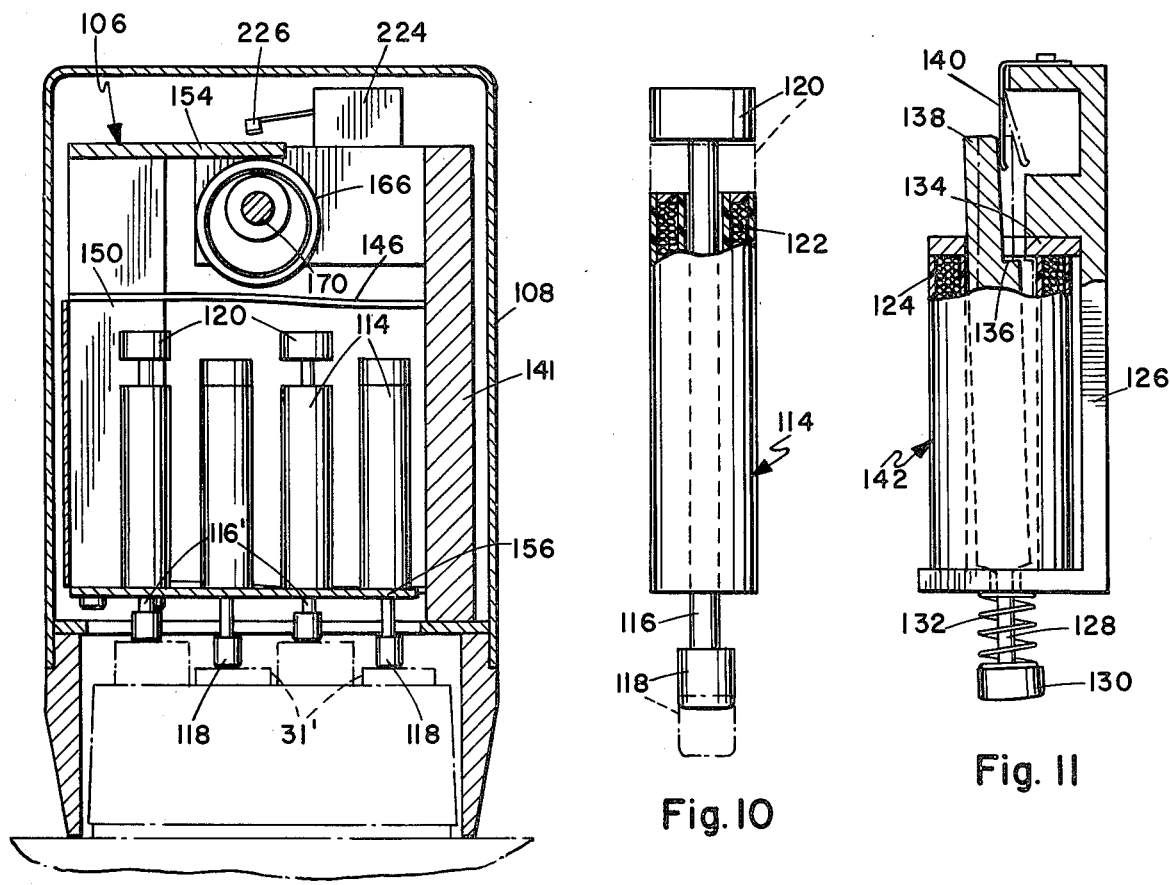
FIG. 9 is a sectional view similar to FIG. 7, but with the mechanism actuated to depress selected keys.
FIG. 10 is an enlarged view, partially cut away, of one of the solenoid assemblies.
FIG. 11 is a similar view of an alternative solenoid assembly.

Referring now to FIG. 11, an alternative configuration for the solenoid assembly is illustrated. Solenoid assembly 142, as with assembly 114, does not produce an extension of the armature upon energization. However, in assembly 142, the locking of the armature is obtained by a mechanical engagement between the solenoid parts. An armature 138 incorporates a lock shoulder 136 which cooperates with a lock flange 134 on the frame 126. The frame 126 also provides a flux path between the opposite ends of the coil 124. Upon energization of the coil 124, the armature 138 is drawn transversely of the solenoid toward the frame 126 and thereby draws the lock flange and lock shoulder into engagement (illustrated by the broken line position of the armature 38). A leaf spring 140 returns the armature 138 to its solid line position after de-energization of coil 124. In the de-energized position, the armature 138 is free to reciprocate vertically, such as by contact between the engagement tip 130 and a key of the keyboard. Vertical movement of the armature 138 compresses a light return spring 132 received around the shaft 128 so that, upon release of the mechanical pressure forcing the armature 138 upwardly, the spring 132 returns the armature and shaft to the extended position.

Referring again to FIGS. 4 through 7, the solenoid assemblies 114 are mounted in the carriage assembly 106. The carriage assembly is mounted for vertical reciprocating movement relative to a fixed frame 141. Frame 141 incorporates upper spring supports 143 and lower spring supports 144 for mounting flexure leaf springs 146 and 148 respectively. The opposite end of the flexures are mounted on the carriage member 150. The carriage member 150 mounts the solenoid assemblies 114 via the support plate 156 and mounts at its upper end a bracket 152 carrying the follower extension 154. The action of the flexures confines the carriage assembly 106 to an essentially vertical reciprocating motion, and adds spring bias to the weight of the carriage forcing the carriage assembly 106 downwardly from the position illustrated toward the keyboard 12. A fixed post 158 and associated engagement tip are secured to the support plate 156 for engaging the enable key 34. Thus, the enable key is automatically depressed during each reciprocation of the carriage assembly 106. A shaft 160 passes through the carriage assembly and is unaffected by its reciprocation. The shaft 160 penetrates the housing 108 and is connected to a clear button 162. When the button 162 is depressed, the shaft 160 and associated engagement tip depress the clear key 36. A spring 164 cooperating between the clear button 162 and the frame member 145 returns the button after actuation.

Figure 5:
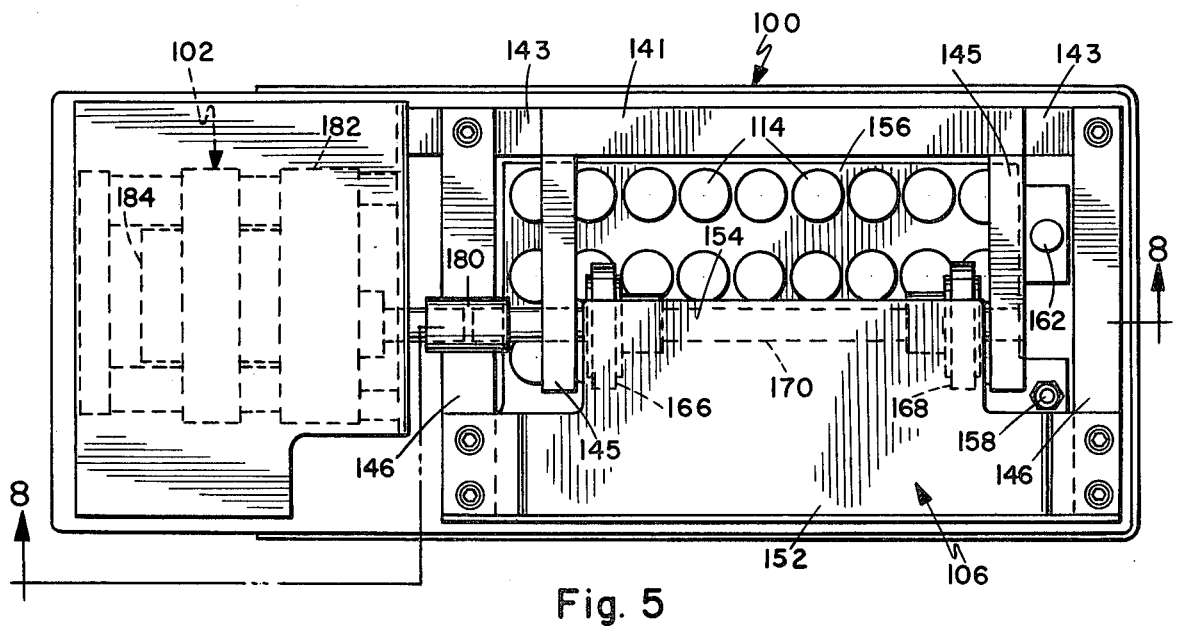
FIG. 5 is a top plan view of the keyboard mechanism with the cover removed.

Referring now particularly to FIGS. 4, 5 and 8, the eccentric assembly 104 is illustrated. A pair of eccentrics 166 and 168 are journalled for rotation on a shaft 170. Shaft 170 is carried in bearings 172 and 174 in the frame member 145. Bearings 176 and 178 on the eccentrics mate between the eccentrics and the follower 154 so that no sliding friction develops between the eccentrics and follower. In the position illustrated, the follower 154 is lifted to hold the carriage assembly against the action of the flexures 146 and 148 and to thereby hold the engagement tips 118 out of engagement with the keyboard 12. Upon 180° of rotation of the shaft 170, the follower 154 is progressively released for downward movement under the influence of the flexures 146 and 148 and the weight of the carriage assembly 106, causing the engagement tips 118 to contact the surface of the several keys 31.

The shaft 170 is connected to the drive assembly 102 by coupling 180. The drive assembly is a one-revolution configuration that incorporates a motor 184 operating through a gear box 182. The design of the one-revolution drive assembly is conventional. According to such a design, a momentary power signal to the motor causes an initial rotation of the motor 184 and latches the power on until the shaft of the gear box 182 completes a full revolution whereupon the power is automatically disconnected and the device locked in position by a brake until the next power cycle.

Referring again to FIGS. 4, 5 and 8, the engagement housing 110 comprises sides 188 and 190 for engaging the sides 42 of the keyboard housing 14 and end engagement flange 186 having an engagement tip 187 for engaging the end of the keyboard housing 14 and cooperating with the peripheral groove 40 to hold the keyboard operating system 100 in position vertically. The wall 192 is spaced from the opposite end of the keyboard housing 14 to accommodate the latch mechanism 112. Operation of the latch 112 by depressing the latch operator 194 causes pivoting of the latch about a pivot pin 196, moving an engagement tip 198 in and out of engagement with the groove 40. The latch 112 is biased to the engaged position by a spring 199.

Figure 3:
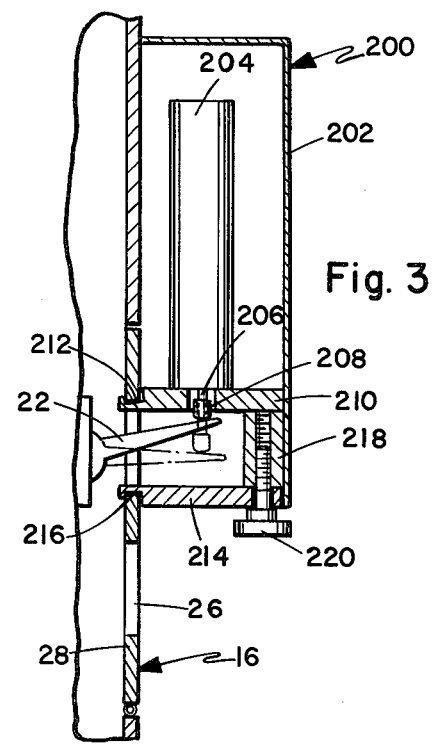
FIG. 3 is an enlarged sectional view taken on line 3—3 of FIG. 1.

Referring to FIGS. 1 and 3, the detailed construction of the cycle solenoid is illustrated. Energization power to the cycle solenoid 200 is provided from the keyboard operating system 100 by cables omitted for clarity. The solenoid coil 204 is mounted with a housing 202 on flange 210. Flange 214 operates in opposition to the flange 210 under the influence of clamp screw 220. A spacer 218 is threaded to receive the clamp screw 220. Upon operation of the clamp screw, the flange 214 is locked in place, causing an engagement of the clamp grooves 212 and 216 with the panel 28 on opposite sides of the opening for the cycle switch 22. Thus, the solenoid 200 is held in position on the panel without engaging any of the outer surfaces of the machine 10 and without interfering with operation of the door panel 28 which may be rotated about a horizontal hinge (not shown) for access to the interior of the machine 10. A shaft 206 is received within the solenoid coil 204 for reciprocating vertical movement. Engagement tip 208 on the shaft 206 is positioned for contacting the cycle switch 22. Energization of the solenoid causes the shaft 206 to extend and operate the cycle switch 22 between the solid and dotted line positions illustrated. Operation of the cycle switch causes printing of a tape with the postage amount as determined by the keys depressed on the keyboard 12 and ejection of the tape from the opening 24. Power is provided to the solenoid 200 from micro switch 224 mounted on frame member 145. A switch operator 226 rides on the follower 154. When the follower reciprocates to its lowest position corresponding to the actuation of the keys, the switch operator 226 closes the contacts in switch 224 and provides power to the solenoid 200 for operating the cycle switch 22.

Figure 12:
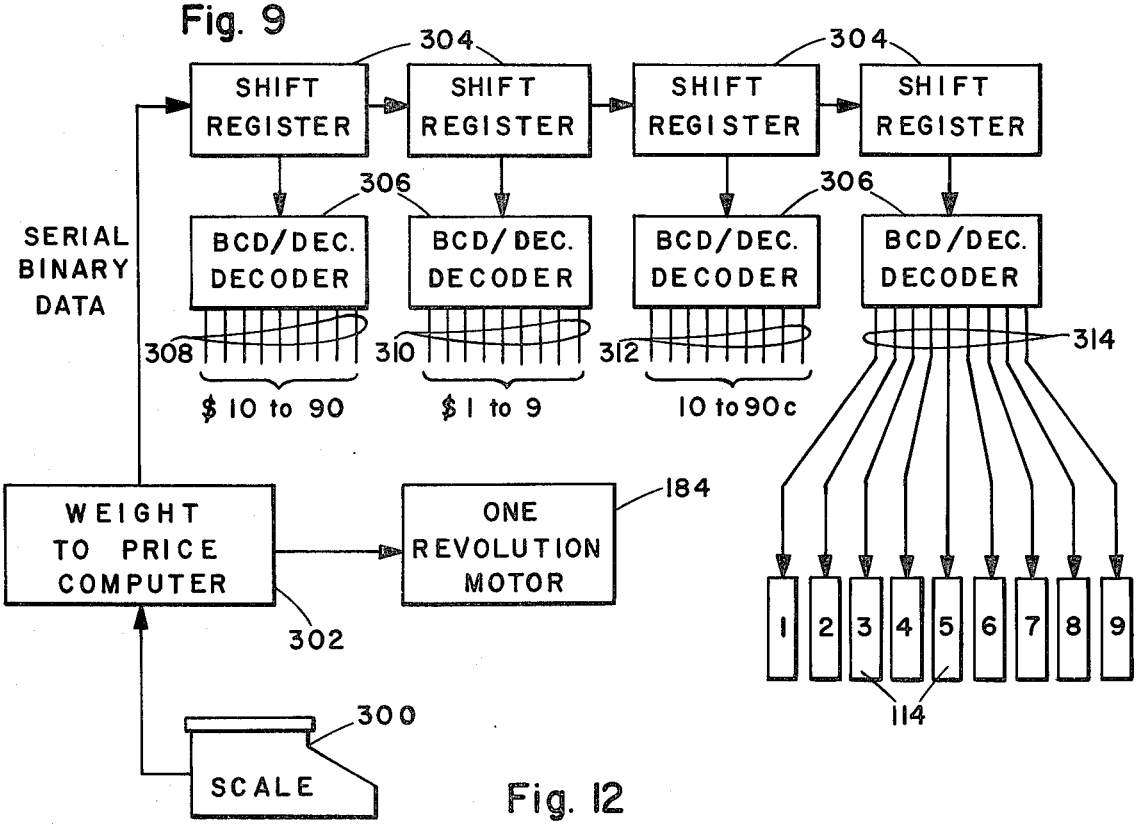
FIG. 12 is a block diagram of the system.

Referring now to FIG. 12, the relationship of the instant invention to an automatic weighing system and signal command system is illustrated. A scale 300 produces a signal from a weighed package corresponding to the weight of the package. Computer 302 calculates the postage required for the package weight and applicable postal zone. The computer output is a serial binary bit of data corresponding to the postage amount. The binary data is sequenced along shift registers 304 until each shift register contains binary information corresponding to the postage amount or entry into each of the four columns of postage keys. Binary data from the shift registers 304 is entered into the binary to decimal decoders 306. Cable bundle 308 is connected to the decoder 306 associated with the tens of dollars column, cable bundle 310 is connected to the decoder 306 associated with the dollars column, cable bundle 312 is connected to the decoder 306 associated with the tens of cents column, and cable bundle 314 is connected to the decoder 306 associated with the cents column. The connections to relays 114 are illustrated diagramatically for the cable bundle 314. If, for example, the last digit in the postage amount is 7 corresponding to $0.07, then the binary to decimal decoder will produce an output on the line within the cable bundle 314 connected to the solenoid positioned over the $0.07 key on keyboard 12.

A single line in each of the other cable bundles for each column of numbers having a non-zero entry will be activated. Thus, for a postage amount of $11.97, the line in cable bundle 308 connected to the solenoid over the ten dollars key of keyboard 12 will be energized. In cable bundle 310, the line connected to the solenoid over the one dollar key would be energized; and in cable bundle 312, the line connected to the solenoid positioned over the cent key would be energized. As noted above for the cable 314, the line connected to the solenoid over the $0.07 key would be energized.

Simultaneously with energization of the selected solenoids, the initial signal to the one-revolution motor 184 is provided. Thus, the eccentrics begin to rotate out from under the follower 154 and permit the carriage assembly 106 to be moved downwardly from the influence of gravity and the flexures. After 180° of rotation, the carriage assembly 106 reaches the position illustrated in FIG. 9. Exemplary keys 31' are illustrated as having been depressed by the spring and gravity pressure transmitted to the keys through the engagement tips 118. For the unenergized solenoids, the shafts 116' are forced upwardly within the coils by contact with the surface of the keys. There is no substantial spring or magnetic resistance to the shaft 116' being forced axially within the coil, so the keys 31 associated with the unenergized solenoids are not depressed. It will be noted that during each cycle of the carriage 106, the enable key 34 is depressed by the fixed shaft 158 and its associated engagement tip.

The position illustrated in FIG. 9 also corresponds to the energization of the cycle solenoid 200. The micro switch 224 is closed by the carriage movement and delivers power to the solenoid coil 204 causing the cycle switch 22 to be moved to the dotted line position illustrated in FIG. 3. Cycle switch 22 activates the tape drive mechanism which then dispenses adhesive backed postage tape from the opening 24. The tape has imprinted thereon the postage entered into the keyboard by the solenoids 114.

If it is desirable to use the machine 10 in its normal mode for imprinting postage on envelopes, the latch operator 194 is pressed drawing the engagement tip 198 out of engagement with the groove 40. The entire housing 108 may then be lifted clear of the keyboard housing 14 and stored for later use. The solenoid 200 may be left on the machine because the cycle switch 22 is not necessary for envelope imprinting operation. If it is desired to remove the solenoid 200, loosening of clamp screw 220 permits sufficient pivoting movement of the engagement flange 214 to withdraw the solenoid from the panel 28.

During the operation, the keyboard may be manually cleared by pressing the clear control 162.

Having described our invention, We now claim:

1. A system for operating selected keys on a keyboard in response to signals corresponding to the selected keys comprising:
   a frame,
   a carriage mounted on said frame for movement toward and away from a keyboard,
   a plurality of solenoids having energization coils, said solenoids being mounted on said carriage,
   each of said solenoids having a shaft moveable between extended and retracted positions and mounting an engagement tip,
   electrical current in said energization coil holding said shaft in said extended position,
   carriage spring means for positioning said carriage over said keyboard and biasing said carriage toward said keyboard,
   said engagement tip on each of said solenoids being positioned opposite a key on said keyboard,
   means on said frame for drawing said carriage away from said keyboard against the bias of said carriage spring means.

2. A system according to claim 1 wherein:
   said solenoid comprises an armature of magnetically permeable material carried on said shaft and overlying an end of said energization coil.

3. A system according to claim 1 wherein:
   said solenoid comprises an armature having a locking engagement surface for engagement with an engagement surface on the body of said solenoid,
   flux path means for drawing said surfaces into engagement upon energization of said coil,
   spring means for biasing said armature out of locking engagement.

4. The system according to claim 1 wherein:
   said means for drawing said carriage comprises a follower connected to said carriage, an eccentric in engagement with said follower and a motor connected to said eccentric.

5. The system according to claim 4 further including:
   a shaft connected to said motor,
   said eccentric being secured on said shaft,
   a bearing between said eccentric and said follower.

6. The system according to claim 1 wherein:
   said carriage spring means comprises at least one pair of flexures,
   said flexures comprise leaf spring members connected to said carriage at one end thereof and connected to supporting structure at the opposite ends thereof.

7. The system according to claim 1 further including:
   an engagement housing surrounding said keyboard and an engagement latch for releaseably engaging said engagement housing.

8. In an apparatus for operating a keyboard type postage metering machine having a plurality of keys, selected keys of which are depressed to enter predetermined postage amounts into the machine wherein the improvement comprises:
   a solenoid for operating a selected key comprising a solenoid coil and a shaft free to move within said solenoid coil under the influence of a normal bias toward extending said shaft,
   flux path means for directing magnetic flux from one end of said solenoid coil to a point adjacent the opposite end of said solenoid,
   an armature attached to said solenoid shaft and in proximity to said terminal portion of said flux path means, said armature is mounted for limited movement transverse to the axis of said solenoid, engagement means on the armature and the frame of said solenoid for producing a locking engagement between said armature and said frame upon transverse movement of said armature toward said terminal portion of said flux path means, whereby said armature may be moved in and out of said solenoid coil when said solenoid is non-energized, and upon energization of said solenoid coil, said armature is drawn into a locking engagement whereby said shaft is held in an extended position.

* * * * *